United States Patent

[11] 3,632,299

[72] Inventor Walter J. Thorsen
El Cerrito, Calif.
[21] Appl. No. 861,225
[22] Filed Sept. 19, 1969
[45] Patented Jan. 4, 1972
[73] Assignee The United States of America as represented by the Secretary of Agriculture
Continuation of application Ser. No. 442,561, Mar. 24, 1965, now abandoned. This application Sept. 19, 1969, Ser. No. 861,225

[54] SHRINKPROOFING OF ANIMAL FIBERS BY PASSING SAID THROUGH AN ELECTRICAL DISCHARGE ZONE CONTAINING OZONE
3 Claims, 3 Drawing Figs.

[52] U.S. Cl................................................... 8/128, 8/2, 8/111, 34/DIG. 24, 204/165, 204/312, 204/321, 204/323, 204/328
[51] Int. Cl..................................................... D06m 3/06, C01b 13/12, B01k 1/00
[50] Field of Search............................................ 8/128, 111, 2; 34/DIG. 24; 204/165

[56] References Cited
UNITED STATES PATENTS
3,369,981  2/1968  Levaux.......................... 8/128

Primary Examiner—George F. Lesmes
Assistant Examiner—J. Cannon
Attorneys—R. Hoffman and W. Bier ABSTRACT: Proteinous animal fibers are rendered shrinkproof by passing said directly through a high-voltage electrical discharge ozone-generating zone which is at atmospheric pressure and open to the atmosphere. The dyeing properties of the fiber are unaffected by the treatment. Apparatus embodying both planar and curved discharge zones are described.

PATENTED JAN 4 1972 3,632,299

W.J. THORSEN
INVENTOR
BY R. Hoffman
ATTORNEY

SHRINKPROOFING OF ANIMAL FIBERS BY PASSING SAID THROUGH AN ELECTRICAL DISCHARGE ZONE CONTAINING OZONE

This application is a continuation of application Ser. No. 442,561, filed Mar. 24, 1965, and now abandoned.

A nonexclusive, irrevocable, royalty-free license in the invention herein described, throughout the world for all purposes of the U.S. Government, with the power to grant sublicenses for such purposes, is hereby granted to the Government of the United States of America.

This invention relates to and has among its objects the provision of novel process and apparatus for shrinkproofing proteinous animal fibers, e.g., wool, mohair, and the like. Further objects of the invention will be evident from the following description wherein parts and percentages are by weight unless otherwise specified.

Figure 1:
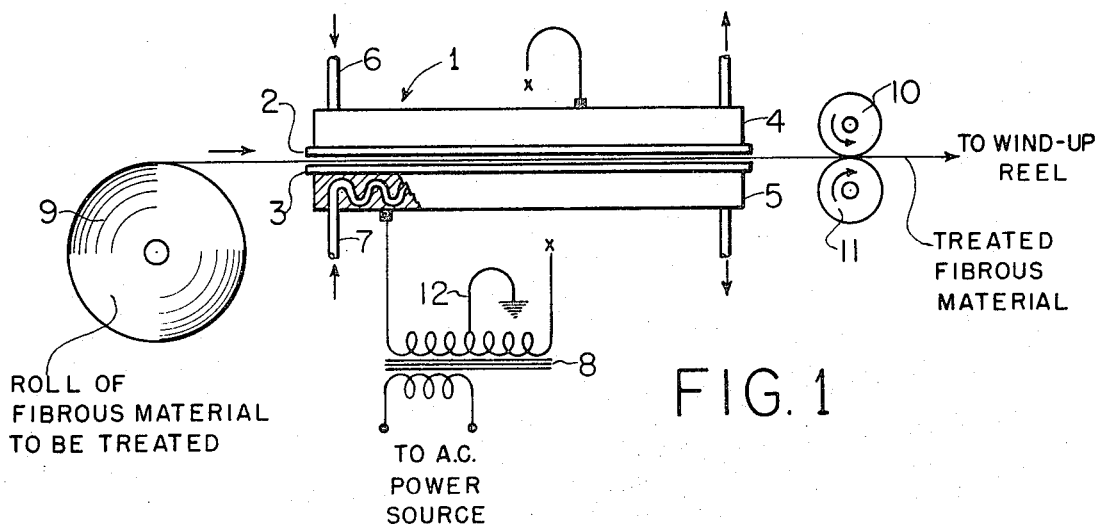
Figure 2:
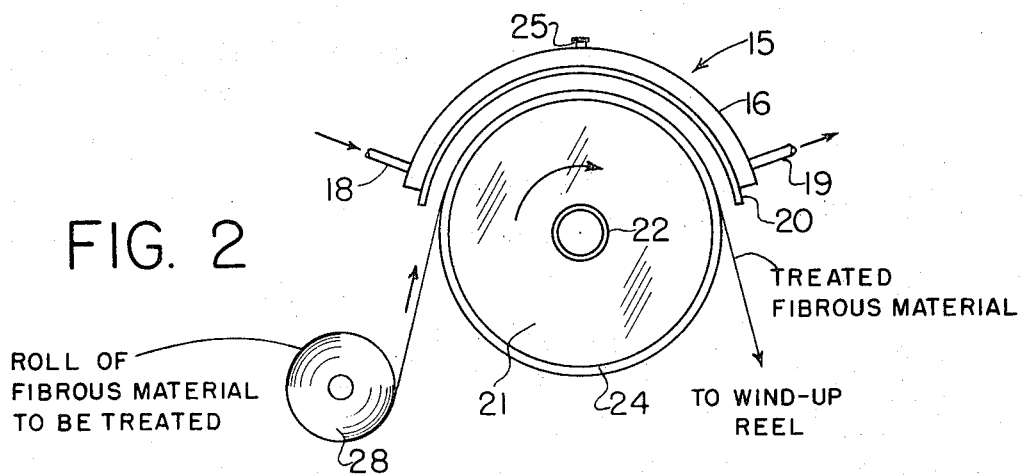
Figure 3:
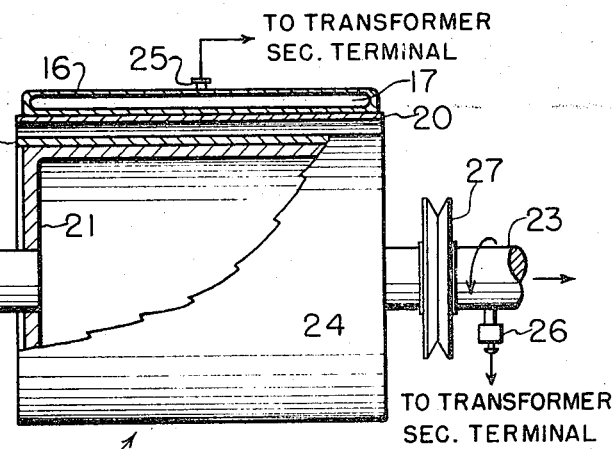

In the annexed drawing,

FIG. 1 illustrates one modification of apparatus for applying the process of the invention. Another modification of the apparatus is shown in FIGS. 2 and 3, wherein FIG. 2 is a front view of the apparatus and FIG. 3 is a side view of the ozone generator, partly in cross section.

In my U.S. Pat. No. 3,149,906 granted Sept. 22, 1964, there is disclosed a process for shrinkproofing animal fibers which essentially involves the following: An ozone generator is provided and the gas issuing from this generator is mixed with a current of steam. The composite stream containing ozone and steam is then blown against the fibrous material for a period of 1 to 10 minutes to achieve the desired result.

I have now found that superior results are attained when the fibrous material is passed directly through the ozone generator. In other words, in the former process ozone is produced in a separate device and then applied to the fibers. In accordance with the invention, the fibers are placed in the very locus where the ozone is generated. This treatment of the fibers with ozone generated in situ yields many advantages over the known technique, as follows:

A primary advantage is that the desired result is attained very rapidly, for example, in a matter of 2 to 20 seconds in contrast to the processing time of at least 1 minute and preferably about 3 minutes required with the former process.

Since the process of the invention requires but a very brief processing time, it is especially adapted for application on a continuous basis as in treating long lengths of fibrous materials. Because of the short treatment time such continuous processing will not interfere with the orderly flow of the fibrous material through the various steps required to convert the original raw fibers into finished textiles.

The invention involves more efficient use of ozone, i.e., less ozone is required per unit weight of fibrous material treated. Since the fibers are located in the zone where the ozone if formed, the ozone can immediately contact the fibers and there is little opportunity for loss of ozone. This is in sharp contrast to systems wherein a gas stream containing ozone is blown through a textile material; in such case much of the ozone will fail to contact the fibers and be lost.

The apparatus used for applying the process of the invention is simpler: There is no need for piping, valves, fans, and other equipment for conducting gases.

The dyeing properties of the fibers are essentially unaltered by the process of the invention. This means that the products can be dyed following conventional formulations and schedules. Accordingly, the process of the invention can be applied to a conventional textile-processing line without interference with the dyeing procedures normally employed in the plant.

Another advantage of the process of the invention is that the intrinsic properties of the fibers such as their acid solubility, alkali solubility, tensile strength, and abrasion resistance are not impaired.

A further item is that no pressure-resistant (nor vacuum-resistant) equipment is required; the entire procedure is carried out at normal atmospheric pressure.

In the former system it is necessary to supply pure oxygen gas to the generator for the production of ozone. In the system of the invention ambient air is entirely satisfactory; it is not necessary to use oxygen.

In the process of the invention the moisture content of the material to be treated is unimportant. Good results are obtained whether the fibrous material is dry or whether it contains its normal content of moisture.

Another item is that yarns made from wool treated in accordance with the invention have a greater tensile strength as compared to yarns prepared from the untreated wool.

One form of apparatus for applying the process of the invention is illustrated in FIG. 1 in the annexed drawing. Referring thereto, the ozone generator generally designated as 1 includes two plates 2 and 3 of dielectric material such as glass, separated by a small distance, about 4 to 10 mm. In contact with the respective plates 2 and 3 are electrodes 4 and 5, made of aluminum, copper, or other electrically conductive metal. The electrodes are provided with tubes 6 and 7 for circulation of a heat-exchange medium therethrough whereby the generator may be cooled (or heated) to maintain it at a desired temperature level.

For energizing generator 1 there is provided a step-up transformer 8. The secondary winding of the transformer is connected to electrodes 4 and 5. (Symbols $x$, $x$ in the figure designate an electrical connection omitted from the figure to avoid confusion with the other parts.) The primary winding is connected to an AC power source. The center tap 12 of the secondary winding is preferably grounded, as shown. The parameters of the energizing system and the power source are chosen to provide an EMF across electrodes 4 and 5 of about 10,000 to 25,000 volts at a frequency of about 60-800 c.p.s. Generally, optimum results are attained act a frequency of about 400 c.p.s. Energized as above set forth, a discharge takes place in the space between plates 2 and 3. Thus the space emits a diffuse violet-colored glow which appears as a series of brush discharges. The discharge causes the formation of various gaseous substances within the space between plates 2 and 3. Thus in addition to the normal constituents of air (since the space is open to the atmosphere), there is present:

Monatomic oxygen (0)

Monatomic oxygen in both negatively and positively charged states

Molecular oxygen ($O_2$), vibrationally excited by the visible light

Molecular oxygen in both negatively and positively charged states

Ozone ($O_3$)

Ozone, vibrationally excited by the ultraviolet light

Ozone in both negatively and positively charged states

Oxides of nitrogen, including nitrogen pentoxide and nitrous oxide

From the above it is apparent that various reactive forms of oxygen and nitrogen are present in the discharge area. Many of the highly reactive species, for example, the vibrationally excited and charged species, decay rapidly and cannot be removed from the discharge area in a gas stream. Accordingly, direct exposure of fibrous material to the discharge area in accordance with the invention produces reactions and fiber modifications which are different from those obtained when the gaseous products of the discharge area are removed therefrom and only then applied to a fibrous material.

In operation, the ozone generator is energized and the textile material from roll 9 is continuously drawn through the generator by driven rollers 10, 11. The treated textile material may then be wound on a reel and further processed as desired. The speed of rollers 10 and 11 is so adjusted that the fibrous material remains in the discharge area for a period long enough to attain the desired shrinkproofing effect but not long enough to damage the fibers. This time will generally range from about 2 to 20 seconds. Also during operation, the heat-exchange fluid (for example, a conventional silicone oil) is circulated through tubes 6 and 7 to maintain generator 1 at a temperature of about 80° to 145° C., preferably 120°–140° C. Ordinarily, in operation of the system the heat-exchange fluid serves to keep the temperature at the desired level by dissipating heat, i.e., heat produced by the generator in forming the gaseous substances in the discharge area and heat produced as these substances react with the fibrous material being treated. On the other hand, when the system is started up, it is cold and the fluid is operated in a heating cycle to warm the generator to the desired temperature level.

Reference is now made to FIGS. 2 and 3 which illustrate a novel form of apparatus which is particularly adapted for continuous treatment of fibrous material. In this modification, the ozone generator generally designated as 15 includes an arcuate upper electrode 16 made of aluminum, copper or other electrically conductive metal. This electrode is of hollow construction, providing a cavity 17 through which a heat-exchange fluid may be circulated via pipes 18 and 19 to maintain the temperature at the desired level. Abutting against electrode 16 is an arcuate plate 20 of dielectric material such as glass. The lower electrode is a hollow drum 21 of copper, aluminum, or other electrically conductive metal, supported on hollow metal shafts 22, 23. A heat-exchange fluid is circulated through hollow drum via shafts 22 and 23 to maintain the temperature at the desired level. About drum 21 is mounted a cylindrical sheet 24 of dielectric material such as glass. The gap between dielectric plates 20 and 24, forming the discharge space, is generally about 4 to 10 mm.

For energizing ozone generator 15 to provide the same type of discharge as in the modification of FIG. 1, terminal 25 on electrode 16 and brush 26 contacting shaft 23 are connected to the secondary winding of a step-up transformer 8, as previously described. Shaft 23 is, of course, in electrical connection with drum 21.

A pulley 27 is keyed on shaft 23 (preferably insulated therefrom) whereby drum 21 and associated dielectric plate 24 may be rotated at a predetermined speed.

In operation, ozone generator 15 is energized and the textile material is continuously drawn from roll 28 by the rotation of drum 21, the material thus being conveyed through the discharge space between arcuate dielectric plate 20 and cylindrical dielectric plate 24. The treated material may then be wound up on a reel and further processed as desired. As in the case of the system of FIG. 1, the speed of rotation applied to shaft 23 is so adjusted that the fibrous material remains in the discharge area for a period long enough for the desired shrinkproofing effect to be attained yet not long enough to damage the fibers. Generally, this period will be in the range about from 2 to 20 seconds. Also during operation, the heat-exchange fluid is circulated through pipes 18, 19 and through hollow shafts 22, 23 to maintain the system at the desired temperature level of about 80°–145° C.

A particular advantage of the modification of FIGS. 2 and 3 is that drum 21 functions not only as an electrode but also as means to support and convey the material being treated. In this way the material is positively fed through the system with no danger of stretching or tearing the material. This feature is particularly important in treating thin webs of material which are easily deformed or torn when subjected to pulling forces. Another advantage of the said modification is that if localized sticking of the fibrous material to the dielectric surface should occur, tearing of the material will not result. The adhered material will part from the dielectric surface as the web unwinds from the drum.

The process of the invention is applicable to animal fibrous materials such as wool, mohair, and other proteinous fibers derived from animal sources. The materials may be in any of various physical forms, e.g., slivers, roving, yarns, top, felts, woven or knitted textiles, etc. Usually, it is preferred to treat the fibrous material before it has been fabricated into a textile. Especially preferred is the treatment of thin webs of fibers, for example, card-webbing, following which the treated material is formed into yarns and then into textile products. Since the process of the invention does not impair the desirable properties of the fibers, materials treated in accordance with the invention may be employed in all the conventional applications of fibrous materials as in production of garments of all kinds.

The invention is further demonstrated by the following illustrative examples.

In the various runs, fibrous materials were treated in an apparatus as shown in FIG. 1, wherein plates 2 and 3 were of borosilicate ("Pyrex") glass one-eighth inch thick, 20 inches wide, and 50 inches long. The gap between the plates was 8 mm. (Example I and Example III); 5 mm. (Example II).

EXAMPLE I

The starting material was wool card-webbing. This is a product of conventional wool-carding operations and is simply an assembly of fibers in the form of a thin web. The web was passed through the ozone generator at a speed which provides a residence time of 12 seconds. The generator, energized at 15,000 volts, 60 c.p.s., was held at 86°–90° C.

Samples of the untreated and treated webbing were subjected to a ball-shrinkage test: In this test 1 gram of the material is put in a 120 ml. vessel with 50 ml. of pH 1.0 HCl-KCl buffer and then the vessel is stoppered and placed on a shaker table. The shaking is continued until the material forms a ball 25 mm. in diameter. The time required to attain this effect indicates the shrinkage character of the fibers. Thus, a longer time indicates that the fibers felt and shrink to a lesser extent. In other words, a longer time for the fibers to form a ball indicates an improvement in resistance to shrinkage.

The results obtained are as follows:

| Material | Time to form ball |
|---|---|
| | min. |
| Untreated | 30 |
| Treated | 120 |

EXAMPLE II

In this run, wool card-webbing was treated as in example I but under the following conditions: The temperature was 142° C. The applied potential was 15,000 volts at 400 c.p.s. Residence time was 4 seconds.

The results obtained are tabulated below:

| Material | Time to form ball |
|---|---|
| | min. |
| Untreated | 30 |
| Treated | 130 |

EXAMPLE III

Wool card-webbing was treated as in example I, using these conditions:

| Temperature | 110° C. |
| Residence time | 10 sec. |
| Potential applied | 15,000 volts (at 400 c.p.s.) |

Samples of the untreated and treated webbing were spun to produce yarns of 1/20 count. The yarns were tested for skein strength with the following results:

| Material | Strength (lbs. at break) | Average Count* | Count × Strength product |
|---|---|---|---|
| Untreated | 41.15 | 19.6 | 806.5 |
| Treated | 53.33 | 19.56 | 1,043.1 |

*Number of 560-yard lengths per lb.

What is claimed is:

1. A method for treating proteinous animal fibers without application of steam which comprises placing the fibers in a high-voltage electrical discharge zone which is at normal atmospheric pressure and open to atmospheric air, and which is energized with an alternating current having an EMF of about 10,000 to 25,000 volts and a frequency of about 60 to 800 cycles per second, and into which zone solely the fibers and atmospheric air are admitted, in which zone the fibers are contacted with ozone and other gaseous substances produced by the action of the discharge on the air contained therein, essentially simultaneously with the formation thereof, and maintaining the fibers in the said zone for a period long enough to attain shrinkproofing of the fibers but not long enough to damage them;

the said electrical discharge zone being maintained at a temperature of about 80° to 145 °C.

2. The method of claim 1 wherein the fibers are wool.
3. The method of claim 1 wherein the fibers are mohair.

* * * * *